(12) United States Patent
El-Hindi

(10) Patent No.: US 7,572,373 B2
(45) Date of Patent: Aug. 11, 2009

(54) OIL FILTRATION VESSEL

(75) Inventor: Joseph El-Hindi, Fayetteville, NY (US)

(73) Assignee: Filtertech Inc., Manlius, NY (US)

( * ) Notice: Subject to any disclaimer, the term of this patent is extended or adjusted under 35 U.S.C. 154(b) by 319 days.

(21) Appl. No.: 10/776,836

(22) Filed: Feb. 11, 2004

(65) Prior Publication Data

US 2005/0173331 A1 Aug. 11, 2005

(51) Int. Cl.
*B01D 29/00* (2006.01)
*B01D 35/00* (2006.01)

(52) U.S. Cl. .............. 210/236; 210/232; 210/237; 210/238; 210/323.1; 210/323.2; 210/436; 210/443; 210/444

(58) Field of Classification Search ........... 210/232, 210/236, 237, 238, 323.1, 323.2, 436, 443, 210/444, 445
See application file for complete search history.

(56) References Cited

U.S. PATENT DOCUMENTS

| | | | | |
|---|---|---|---|---|
| 1,678,704 A | * | 7/1928 | Morrison | 210/171 |
| 1,873,594 A | * | 8/1932 | Johnson | 210/277 |
| 1,919,085 A | * | 7/1933 | Alliott | 210/236 |
| 2,278,148 A | * | 3/1942 | Humes et al. | 210/238 |
| 2,843,267 A | * | 7/1958 | Anderson | 210/236 |
| 2,936,075 A | * | 5/1960 | Davis | 210/236 |
| 3,438,502 A | * | 4/1969 | Borre et al. | 210/232 |
| 4,260,489 A | * | 4/1981 | Greig et al. | 210/771 |
| 4,488,965 A | * | 12/1984 | Muller et al. | 210/232 |
| 5,037,461 A | * | 8/1991 | Zievers et al. | 55/482 |
| 5,152,815 A | * | 10/1992 | Zievers et al. | 55/341.1 |
| 5,833,725 A | * | 11/1998 | Dehn et al. | 55/302 |
| 5,833,848 A | * | 11/1998 | Tominari et al. | 210/232 |
| 5,876,471 A | * | 3/1999 | Lippert et al. | 55/341.1 |
| 6,221,266 B1 | * | 4/2001 | Wilkie et al. | 210/791 |
| 6,783,117 B2 | * | 8/2004 | Wohrle | 261/26 |
| 2002/0158002 A1 | * | 10/2002 | Trotzki et al. | 210/332 |
| 2004/0188339 A1 | * | 9/2004 | Murkute et al. | 210/321.8 |

* cited by examiner

*Primary Examiner*—John Kim
(74) *Attorney, Agent, or Firm*—George R. McGuire; Bond Schoeneck & King, PLLC

(57) ABSTRACT

A filter system having individual compartments, a removable filter rack in each compartment, and an array of filter elements positioned in candle housing that are moveable into and out of the filter racks. Each compartment has an independent set of dirty oil inlets, clean oil outlets, overflow outlets, and air purge inlets, and is fluidly separated from adjacent compartments by the interior walls of the frame. Each rack may be disengaged from the various pipes and removed from the frame without disengaging the racks in adjoining compartments. As a result, the filter elements may be serviced without having to take the entire system off-line.

11 Claims, 11 Drawing Sheets

OIL FILTRATION VESSEL

BACKGROUND OF THE INVENTION

1. Field of Invention

The present invention relates to industrial oil filtration systems and, more specifically, to an improved filter system having filter elements that can be serviced while other portions of the system remain at least partially online.

2. Description of Prior Art

Oil filtration vessels are useful in industrial applications, such as hot and cold rolling mills, because oil cleanliness is directly related to quality of the final product. The degree and type of filtration required influences the design of the complete system. Some conventional filter systems may use paper media filter over a reservoir tank. Oil is pumped onto the filter media from where it falls into a reservoir tank. However, this method of filtration is only suitable for some hot mill applications. Other conventional filter systems use pre-coat type filters having a candle or pressure plate design. The filter is normally composed of various blends of diatomaceous earth and Fuller's earth, depending on the particular process, the length of the filter run, and the necessary oil quality. With these filters, however, it is necessary to periodically stop filtration, remove contaminated materials, and replace the filters before going back on line.

Another conventional filtration system uses tiers of fiberglass candle filters that are stacked into a large, cylindrical tank having a conical bottom. Used oil is pumped over the top of each tier of fiberglass filter elements so that contaminates adhere to the fiberglass as the oil is drawn downward by gravity. Filtered oil is collected on a mounting plate positioned beneath each tier of fiberglass cylinders and then pumped away for temporary storage and eventual return to industrial applications. Highly concentrated soiled oil accumulates in the bottom of the filter tank and is removed via a pump.

While a supamic filter adequately filters industrial oil, the maintenance required to maintain the system results in significant periods of downtime and hampers overall efficiency of a filtering system. Although accumulated sludge may be removed from the fiberglass filter elements by backwashing with compressed air, backwashing is not always effective and the filter elements must be periodically removed and cleaned to insure proper operation of the system. In order to clean the filter elements, however, the filter tank must be disassembled so that the filter elements can be removed and washed with industrial cleaners. As a result, the filter tank must be taken out of service, thereby halting or limiting the filtration capabilities of the entire system.

3. Objects and Advantages

It is a principal object and advantage of the present invention to provide a filter system that is easy to service.

It is an additional object and advantage of the present invention to filter system that can remain on-line during service operations.

It is a further object and advantage of the present invention to provide a filter system that is modular and can be easily configured into various sizes for different applications.

Other objects and advantages of the present invention will in part be obvious, and in part appear hereinafter.

SUMMARY OF THE INVENTION

The present invention is a filter vessel comprising a frame having individual compartments, a removable filter rack in each compartment, and an array of filter elements positioned in candle housing that are moveable into and out of the filter racks. Each compartment has an independent set of dirty oil inlets, clean oil outlets, overflow outlets, and air purge inlets, and is fluidly separated from adjacent compartments by the interior walls of the frame. Each rack may be disengaged from the various pipes and removed from the frame without disengaging the racks in adjoining compartments. As a result, the filter elements may be serviced without having to take the entire system off-line.

DETAILED DESCRIPTION

Figure 1:
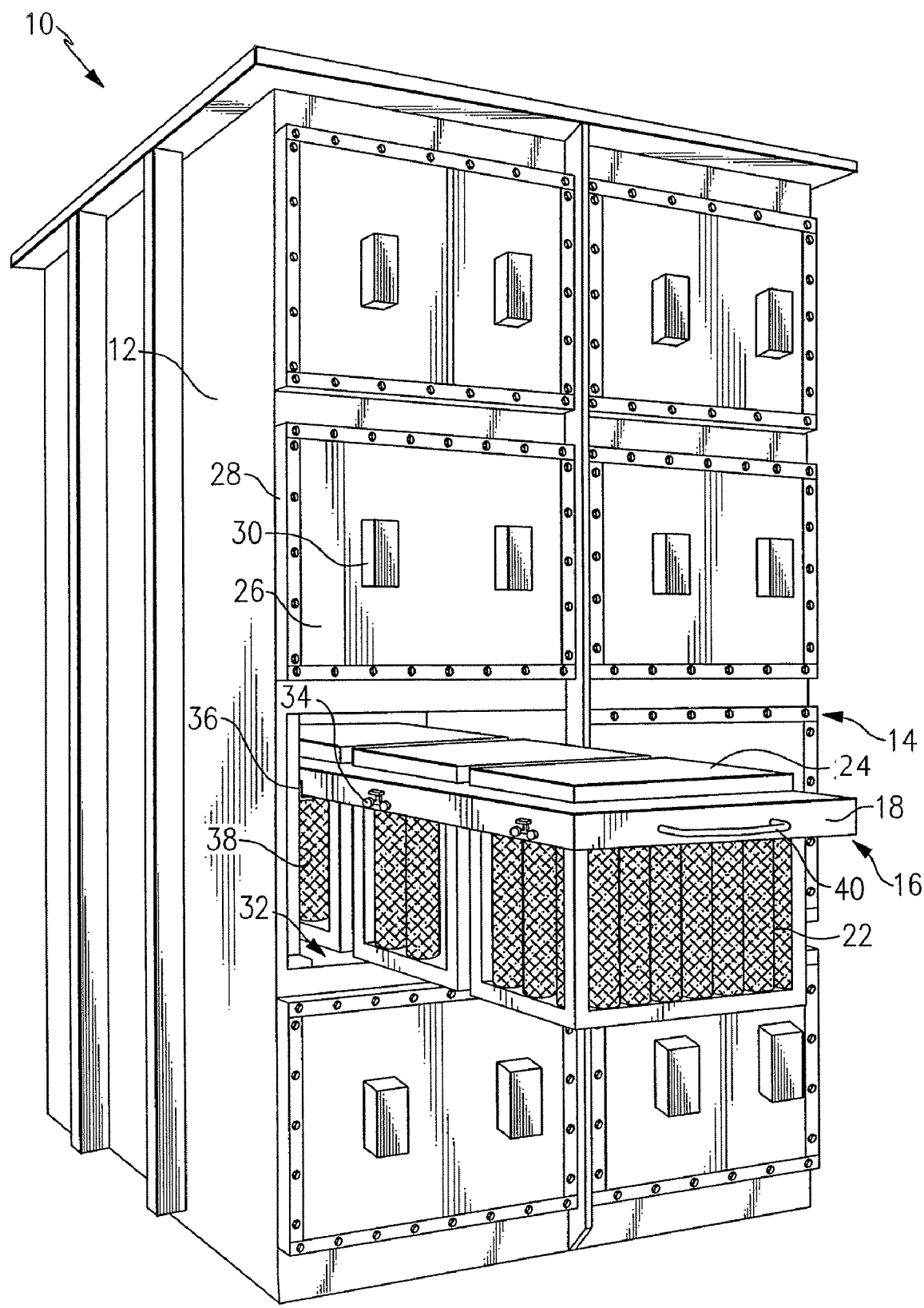
FIG. 1 is a perspective view of a vessel according to the present invention.

Referring now to the drawings wherein like numerals refer to like parts through, there is seen in FIG. 1 a filter vessel 10 according to the present invention. Vessel 10 generally comprises a vessel frame 12 having individual compartments 14, and a set of removable racks 16 in sliding engagement with each compartment 14. Each rack 16 includes a circumferentially extending hollow rack tube 18 that is in fluid engagement with a candle housing 20. Candle housing 20 supports an array of filter elements 22 threadably engaged to a mounting plate 24 that forms the base of candle housing 20.

The front of each compartment 14 is enclosed by a door 26 mounted securely to frame 12 via bolts 28. Each door further includes a handle 30 or other similar structure for assisting with the removal of door 26 from frame 12 after bolts 28 are removed. Each horizontal pair of rack 16 in each compartment 14 are fluidly isolated from adjoining pairs of racks 16 via the interior compartment dividing floors 32 of frame 12.

Rack 16 includes a series of cam followers 34 positioned on the outer surface of rack tube 18 for sliding engaging L-shaped brackets 36 welded to the interior side walls 38 of each compartment 14. Cam followers 34 and corresponding brackets 36 allow sliding movement of rack 18 into and out of frame 12. Rack 18 further includes a forwardly mounted handle 40 for assisting with the insertion or removal of rack from compartment 14.

Figure 10:
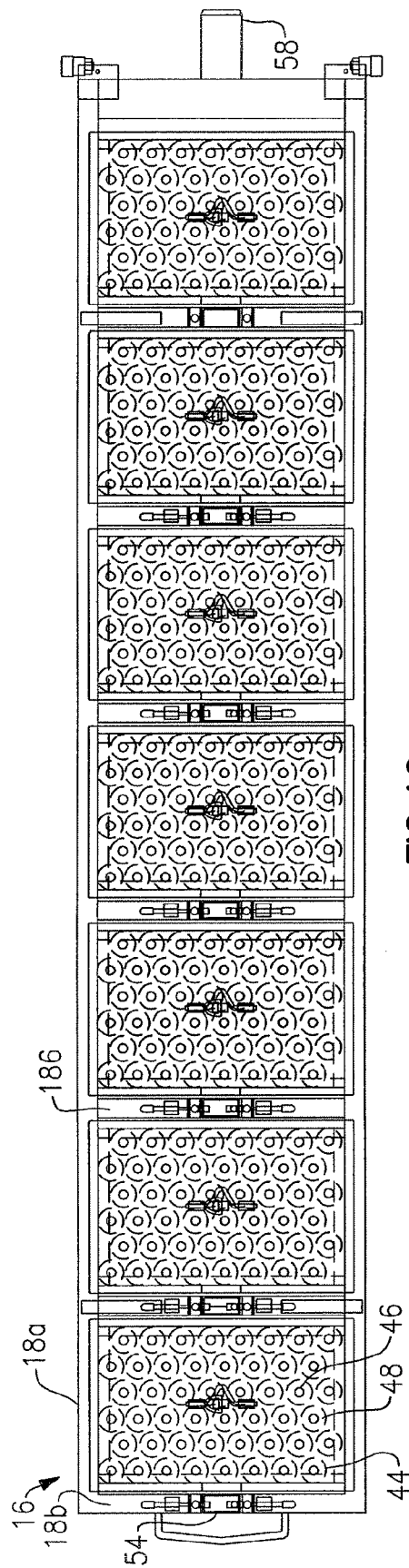
FIG. 10 is a top view of rack according to the present invention.
Figure 11:
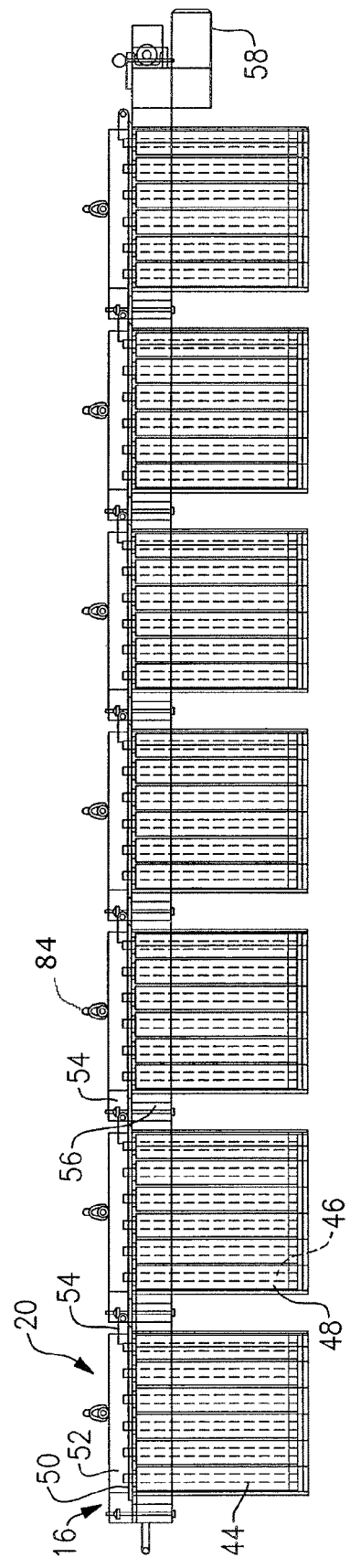
FIG. 11 is a side view of a rack according to the present invention.
Figure 12:
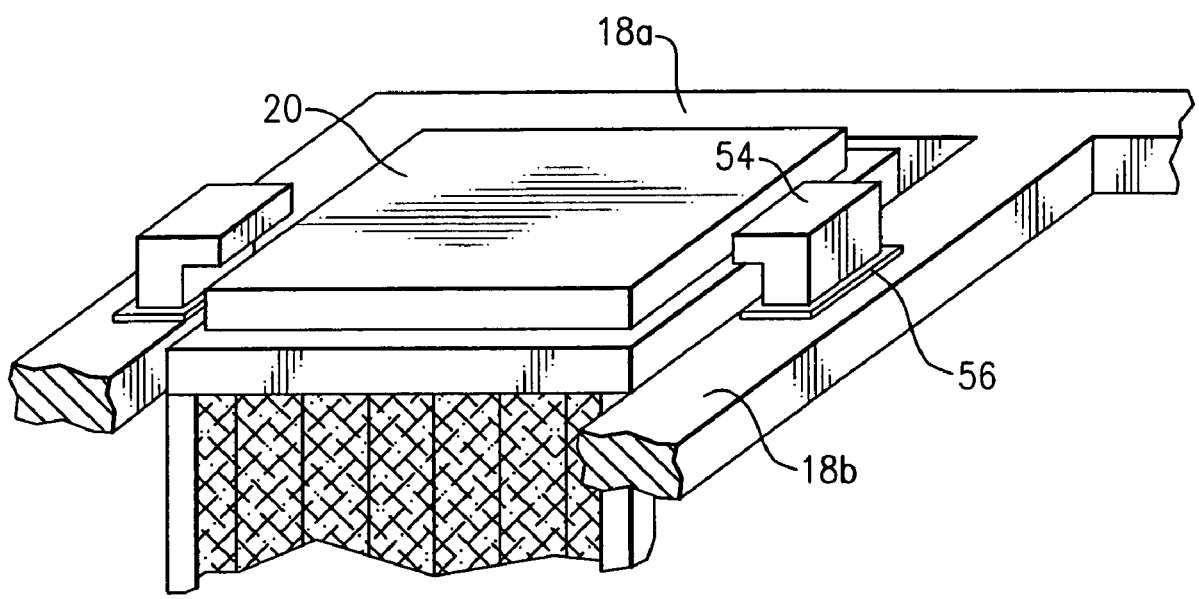
FIG. 12 is a perspective view of a candle housing according to the present invention.

Referring to FIGS. 10-12, each rack 16 comprises a rack tube 18 having an outer rack tube frame 18a and multiple cross-members 18b that supporting candle housings 20.

Candle housings 20 include an array of filter elements 44 positioned therein. Filter elements 44 are preferably candle-type filters having a permeable core 46 surrounded by filter media 48, such as compressed fiberglass filters. Core 46 is threadably engaged to a mounting plate 50 forming the base of candle housing 20 and in fluid communication with a hollow chamber 52 above filters 44 within candle housing 20. As seen in FIG. 12, candle housing 20 is in fluid communication with a conduit 54 that sealingly engages with a port 56 in rack tube cross-member 18*b*. Conduit 54 is preferably welded to candle housing 20 and sealed to cross-member 18*b* via a gasket or similar sealing structure. When candle housing 20 is lifted out of rack 18, such as when servicing is being conducted, conduit 54 disengages from port 56 of cross-member 18*b*. In this manner, chamber 52 of each candle housing 20 is fluidly interconnected with rack tube 18 for expelling filtered oil that flows upward out of filter elements 44.

Figure 2:
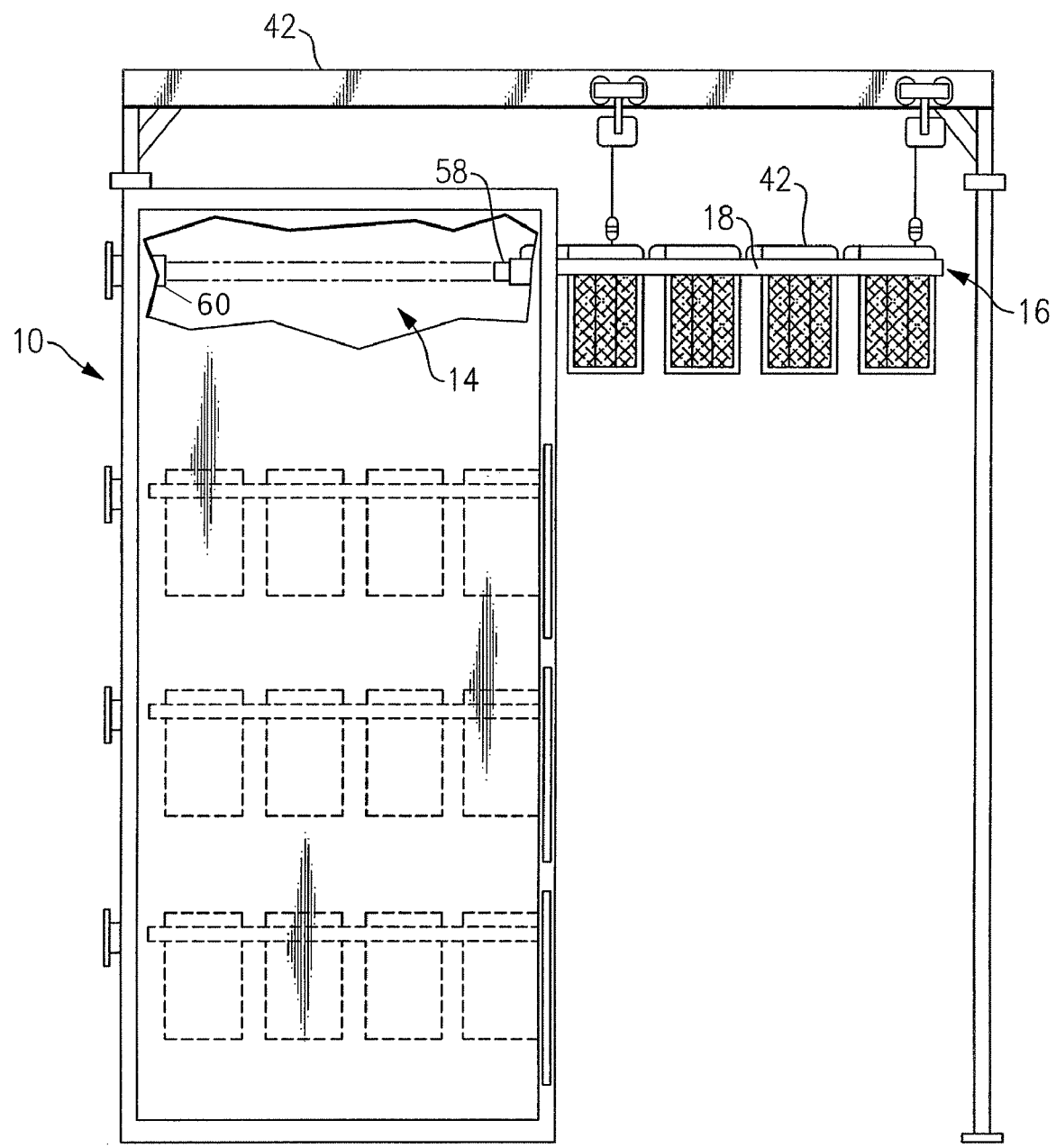
FIG. 2 is a partial cut-away side view of a vessel according to the present invention.

As seen in FIG. 2, rack tube 18 terminates in a male connector 58 at the rearward end of rack 16 that engages a corresponding female connector 60 in the rear of compartment 14 when rack 16 is fully inserted therein. A hoist may be interconnected to rack 16 for assistance in insertion or removal.

Figure 3:
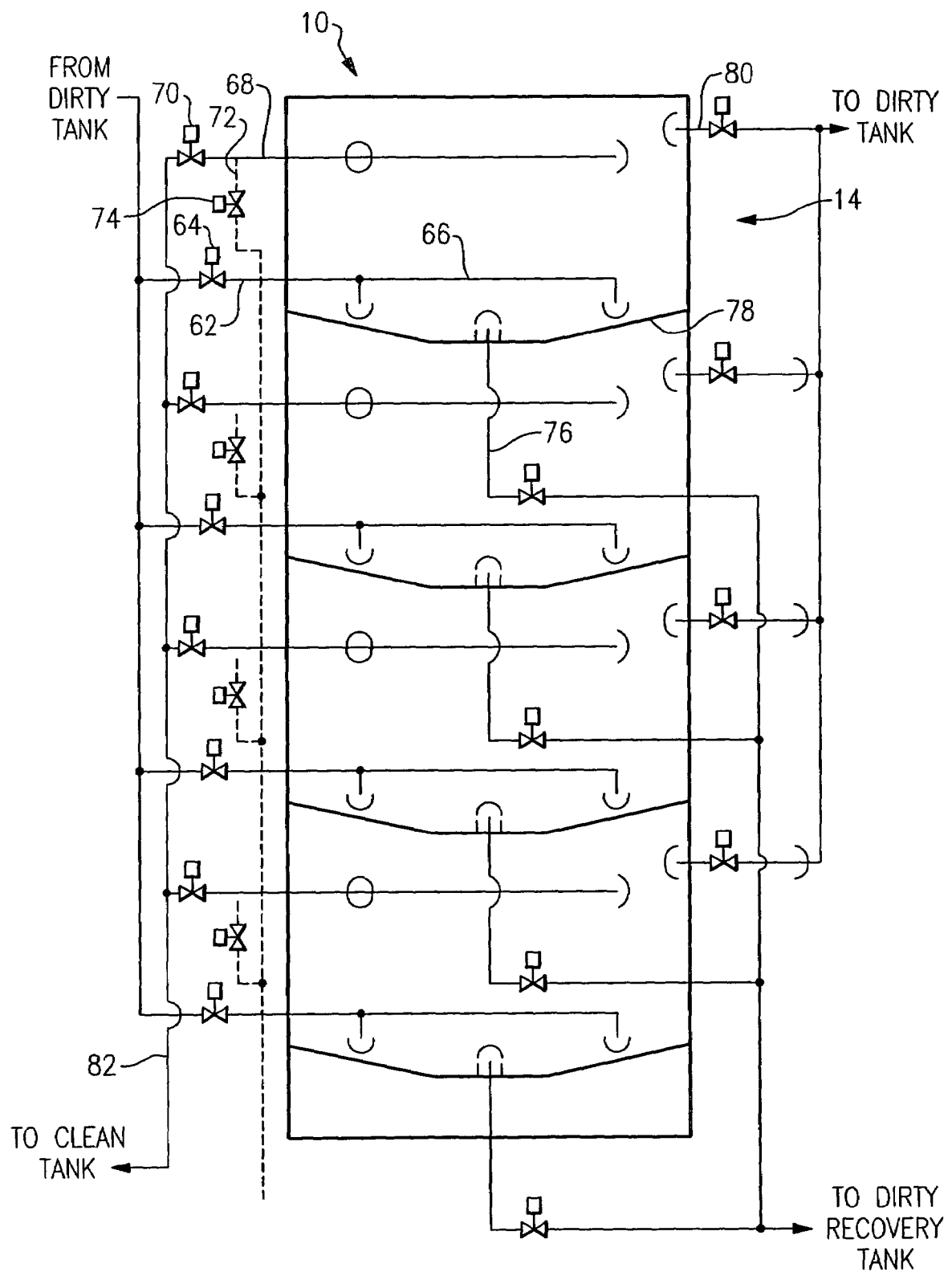
FIG. 3 is a flow diagram of a vessel according to the present invention.
Figure 4:
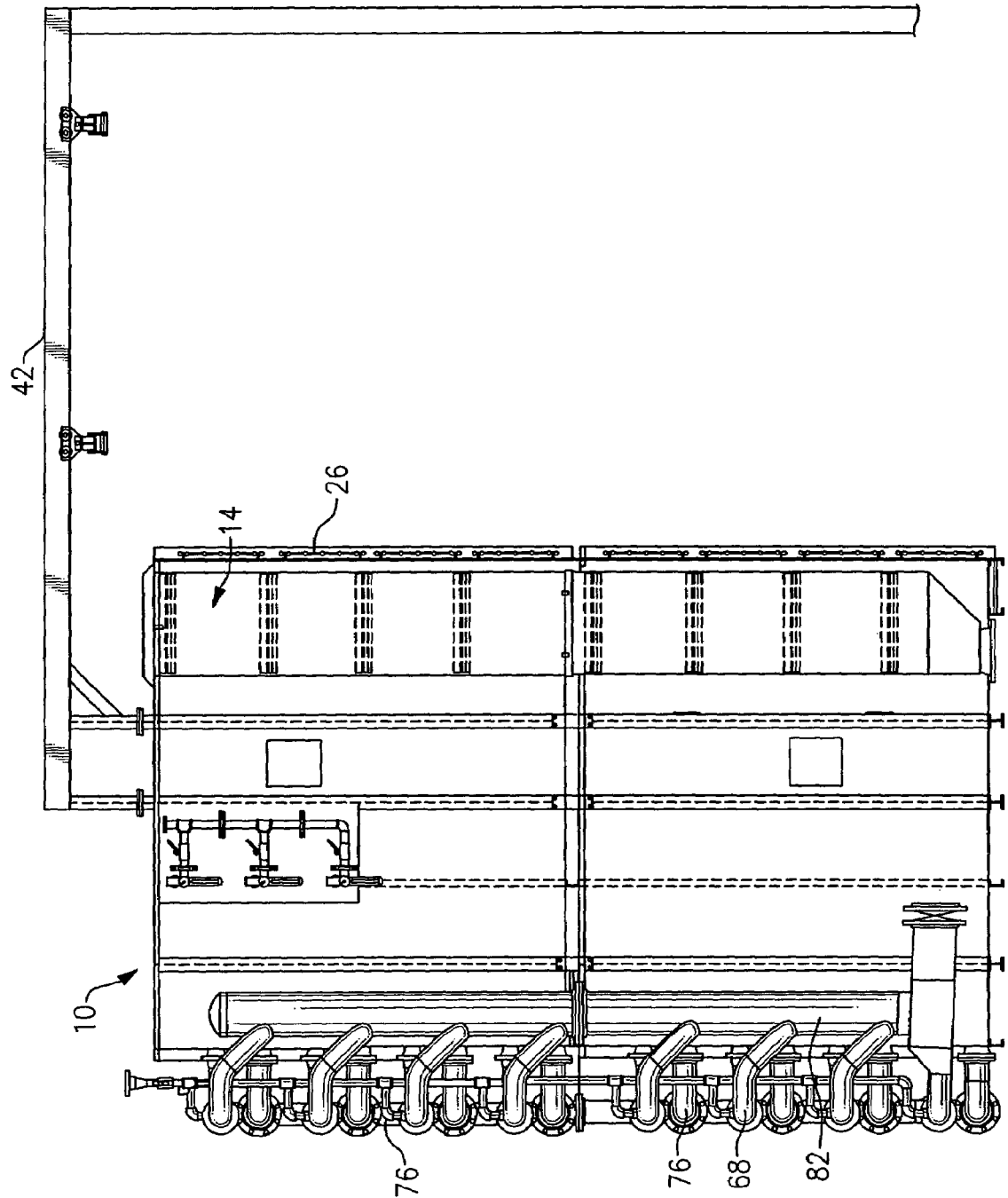
FIG. 4 is a side view of a vessel according to the present invention.
Figure 5:
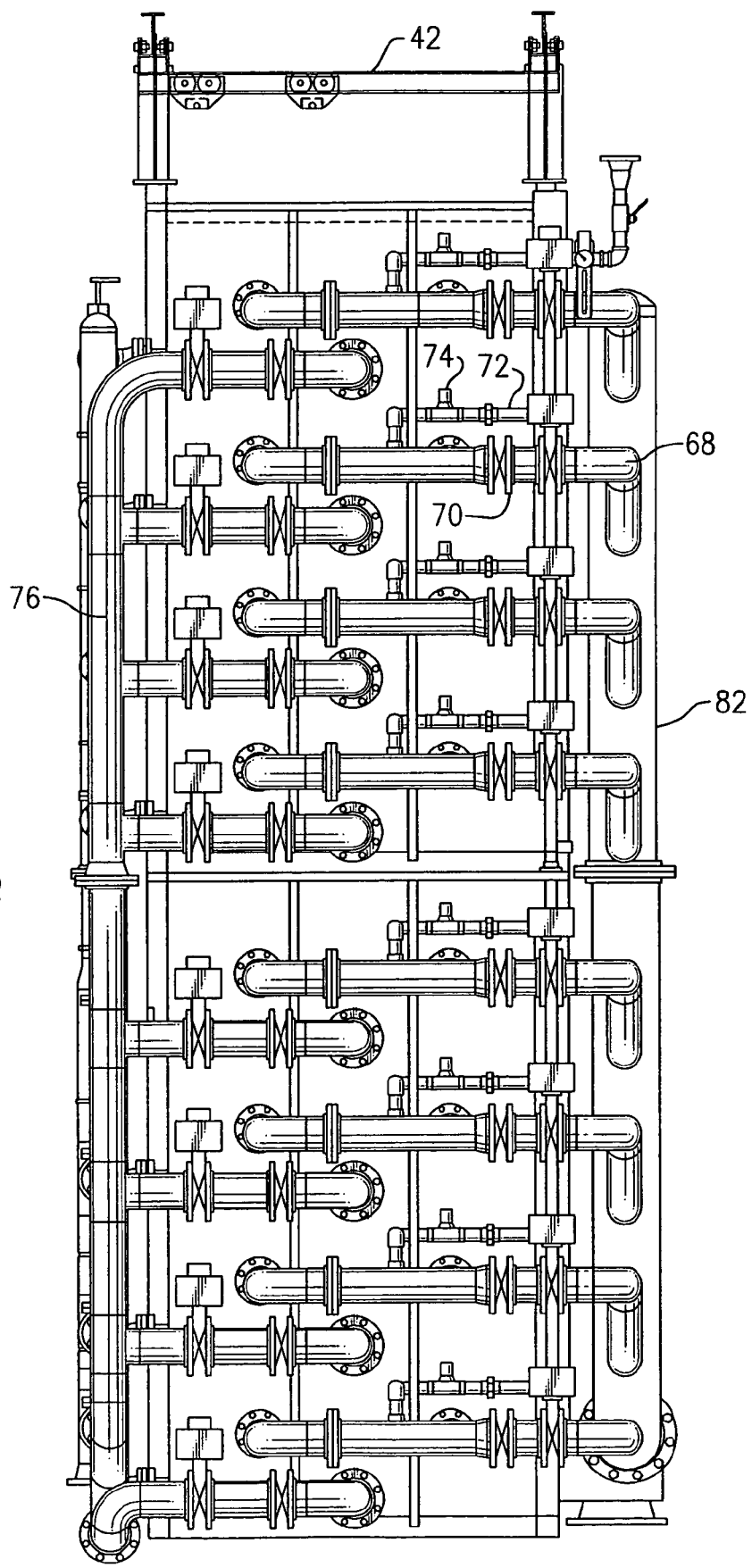
FIG. 5 is a rear view of a vessel according to the present invention.
Figure 6:
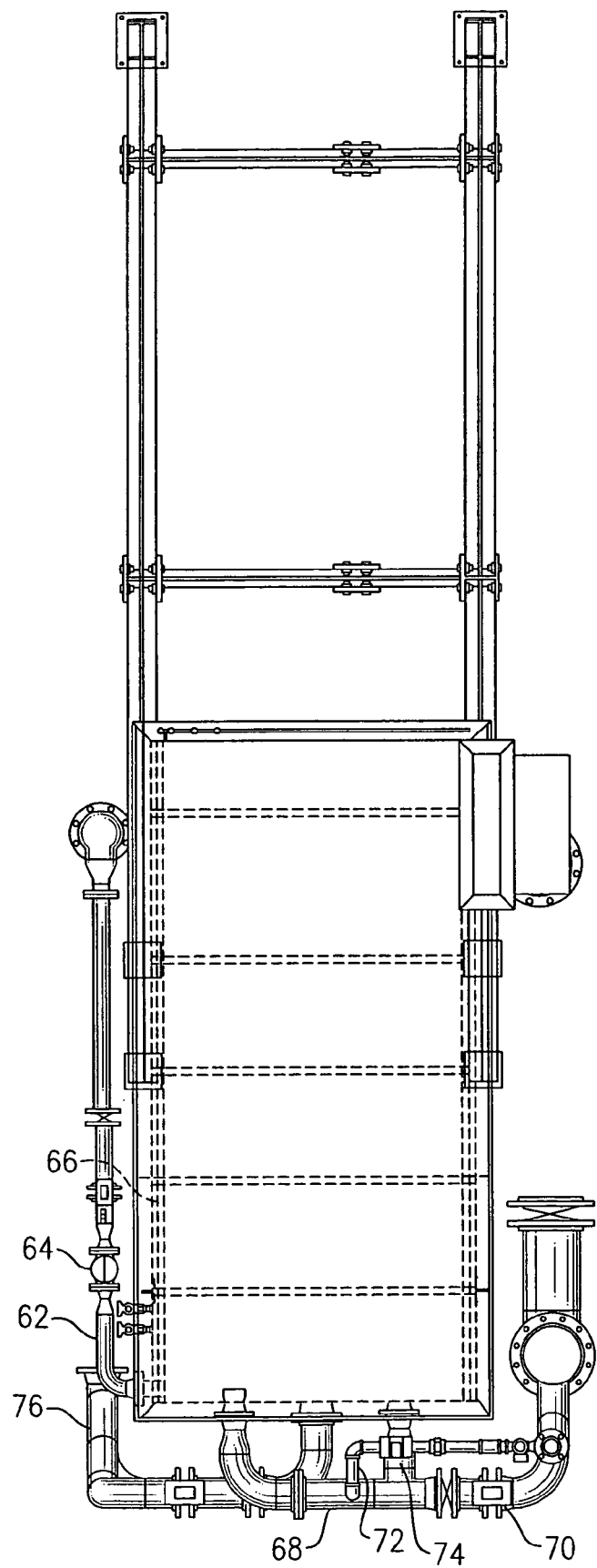
FIG. 6 is a top view of a vessel according to the present invention.

As shown in FIG. 3, each compartment 14 includes a set of dirty oil inlet pipes 62 and inlet valves 64 in fluid communication with the lower portion of compartment 14 for introducing and controlling the flow of dirty oil into vessel 10. Dirty oil is preferably fed into a header 66 for distribution around the perimeter of compartment 14. Compartment 14 further includes a clean oil outlet pipe 68 and outlet valve 70 interconnected to female connector 60 for accepting filtered oil from vessel 10 and returning it for storage and/or reuse.

An air purge line 72 and air purge valve 74 is interconnected to outlet pipe 68 upstream of outlet valve 70. When air purge valve 72 is opened and outlet valve 70 is closed, air may be flushed backwardly into vessel 10 to assist in routine maintenance and cleaning that does not require removal of rack 16 from compartment 14.

Compartment 14 includes a purge line 76 positioned in the bottom of a sloped pan 78 that forms floor 32 of compartment 14. Sloped pan 78 encourages the drainage of dirty oil and sludge that settles in compartment 14 to purge line 76. An overflow pipe 80 may be positioned in the upper portion of each compartment to prevent overfilling of vessel 10 with dirty oil.

Figure 7:
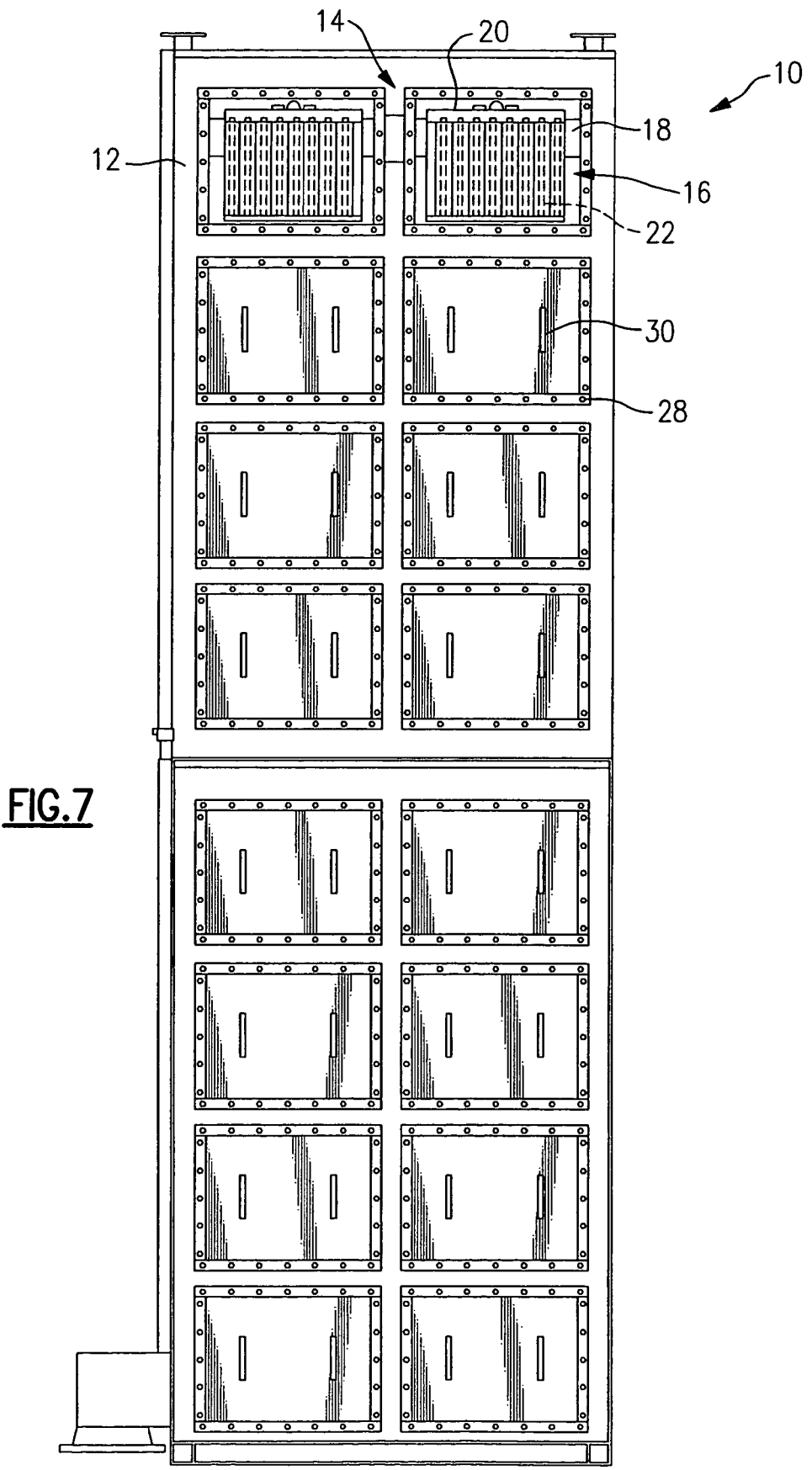
FIG. 7 is a front view of a vessel according to the present invention.
Figure 8:
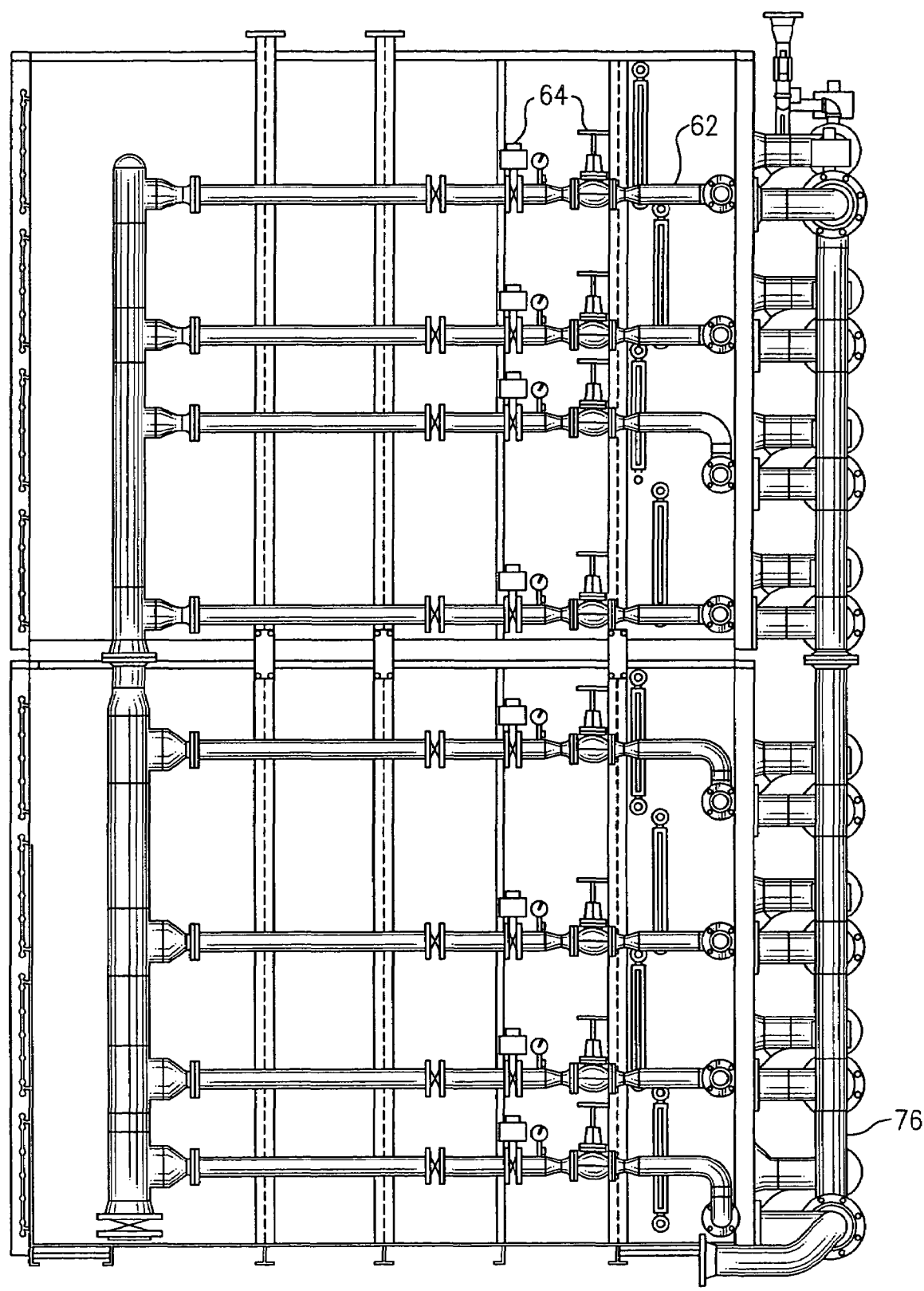
FIG. 8 is a side view of a vessel according to the present invention.
Figure 9:
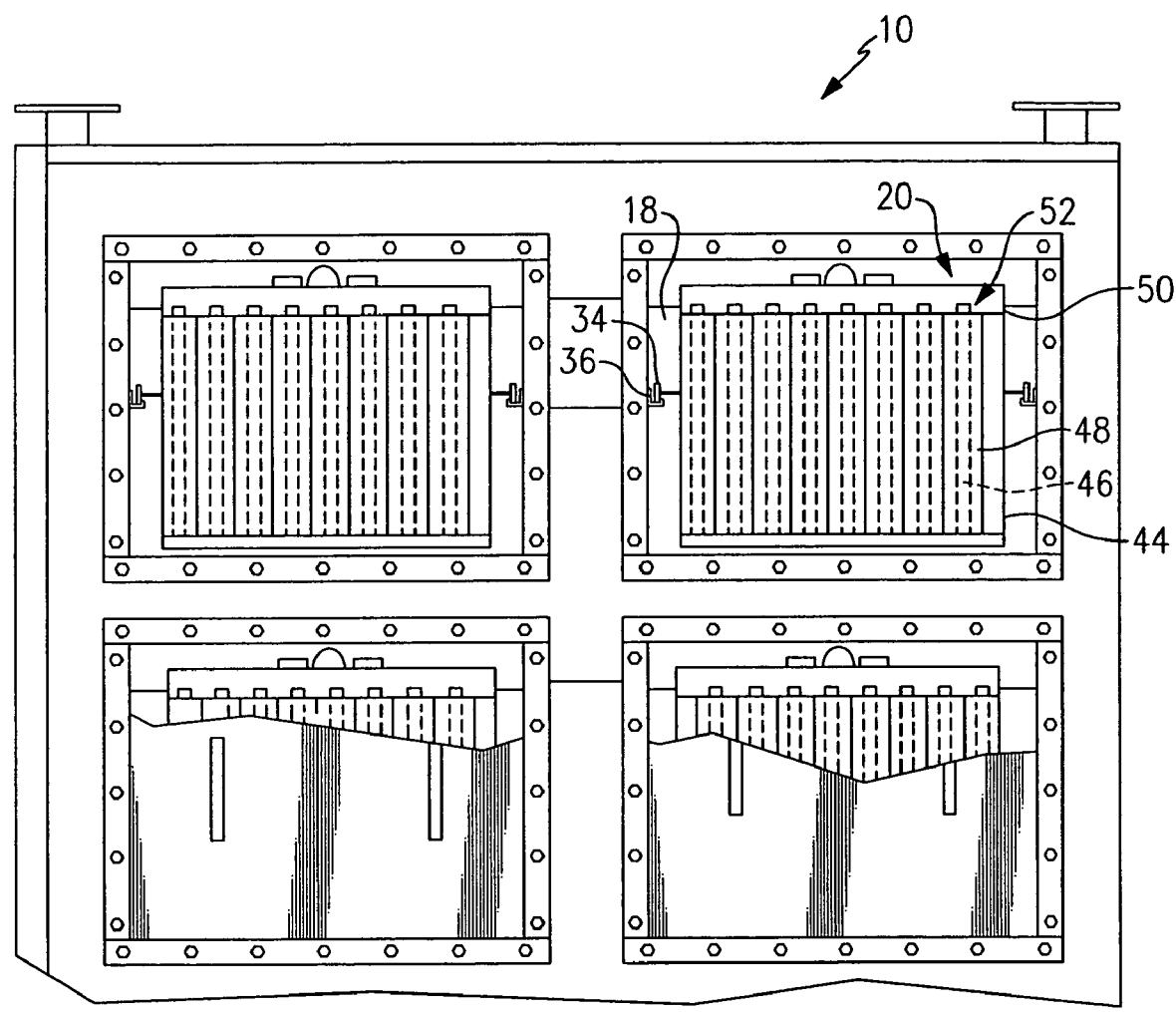
FIG. 9 is a partial cut-away view of a compartment according to the present invention.

Vessel 10 may comprise any number of compartments 14 having dual racks 16, such as the four compartments 14 as depicted in FIG. 1 or even eight compartments 14 as shown in FIG. 7.

To commence filter operations, dirty oil is pumped or gravity-fed through inlet pipes 62 and distributed by header 66 into the bottom of compartment 14. As dirty oil fills compartment 14, it is absorbed by filter elements 44, filtered through contact with filter media 48, and the resulting clean oil is deposited into permeable core 46. When the level of clean oil in core 46 reaches chamber 52, it flows through conduit 54 into rack tube 18. Clean oil that collects in rack tube 18 passes through male and female connectors 58 and 60, respectively, and into clean oil outlet pipe 68. The clean oil in outlet pipes 68 leading from each compartment 14 collects into an effluent line 82. Effluent line 82 may lead to a clean oil storage tank or return the clean oil to the various industrial applications for reuse.

Filter elements 44 in any given compartment 14 are repaired or replaced by closing dirty inlet valve 64, disengaging male connector 58 from female connector 60 of outlet pipe 72, and sliding rack 16 out of compartment 14. As seen in FIG. 11, candle housing 20 may include a hoist catch 84 for assisting in the removal by hoist 42.

As each compartment 14 is isolated from adjoining compartments 14 by interior floors 32 and sloped pans 78, the removal of any rack 16 from frame 12 will not affect filtration operations in other compartments 14. Thus, the maintenance and/or replacement of filter elements 44 in any particular compartment 12 can occur without taking vessel 10 completely off-line.

What is claimed is:

1. A vessel for filtering oil, comprising:
    a frame defining at least one compartment having a female connector fixedly mounted inside the compartment;
    at least two brackets mounted inside the compartment;
    an inlet pipe for injecting dirty oil into said compartment;
    a tubular rack having a plurality of cam followers for slidingly engaging said brackets and a male connector for selectively engaging said female connector, such that said male connector engages said female connector when said rack is positioned within said compartment and said male connector disengages from said female connector as said rack is withdrawn from said compartment;
    at least one candle housing including a plurality of filter elements removeably positioned in said rack and in fluid communication with said rack; and
    an outlet pipe interconnected to said female connector for removing clean oil.

2. The vessel of claim 1, further comprising:
    an air purge line interconnected to said outlet pipe;
    a sludge purge line positioned in the bottom of said compartment; and
    an overflow line positioned in the top of said compartment.

3. The vessel of claim 2, further comprising
    a door for enclosing said compartment when said rack is positioned in said compartment; and
    a handle attached to said door.

4. The vessel of claim 1, wherein said candle housing includes a mounting plate for threadably engaging said filter elements.

5. The vessel of claim 4, wherein said candle housing defines a chamber above said mounting plate that is in fluid communication with said filter elements.

6. The vessel of claim 5, wherein said chamber is interconnected to and in fluid communication with said tubular rack.

7. The vessel of claim 6, wherein said filter elements comprise a permeable core surrounded by compressed filter media.

8. The vessel of claim 7, wherein said core is threadably engaged to said mounting plate.

9. The vessel of claim 8, further comprising a header interconnected to said inlet pipe for distributing dirty oil around said compartment.

10. The vessel of claim 1, wherein said compartment includes a sloped floor pan.

11. The vessel of claim 1, wherein said frame defines a plurality of said compartments, each said compartment including a pair of said tubular racks.

* * * * *